(12) United States Patent
Naito et al.

(10) Patent No.: US 8,027,274 B2
(45) Date of Patent: Sep. 27, 2011

(54) MULTICAST COMMUNICATION SYSTEM AND METHOD

(75) Inventors: Kaname Naito, Tokyo (JP); Akira Kobayashi, Tokyo (JP); Katsuhiro Ochiai, Tokyo (JP); Motonobu Kimura, Tokyo (JP); Shuhei Miura, Tokyo (JP); Junichi Sato, Tokyo (JP); Takashi Okazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 256 days.

(21) Appl. No.: 12/523,855

(22) PCT Filed: Jan. 25, 2008

(86) PCT No.: PCT/JP2008/051077
§ 371 (c)(1),
(2), (4) Date: Jul. 20, 2009

(87) PCT Pub. No.: WO2008/090977
PCT Pub. Date: Jul. 31, 2008

(65) Prior Publication Data
US 2010/0046514 A1 Feb. 25, 2010

(30) Foreign Application Priority Data
Jan. 26, 2007 (JP) .................. 2007-016639

(51) Int. Cl.
*H04L 12/28* (2006.01)

(52) U.S. Cl. ....................... 370/254; 370/390

(58) Field of Classification Search ........................ None
See application file for complete search history.

(56) References Cited

U.S. PATENT DOCUMENTS

| 2006/0200561 A1* | 9/2006 | Tsuhara et al. ............... 709/226 |
| 2007/0047545 A1* | 3/2007 | Bou-Diab et al. ............ 370/390 |
| 2007/0081459 A1* | 4/2007 | Segel et al. .................... 370/230 |
| 2007/0086458 A1* | 4/2007 | Narayanan et al. ........... 370/390 |
| 2007/0253435 A1* | 11/2007 | Keller et al. ................... 370/401 |

FOREIGN PATENT DOCUMENTS

| JP | 2000244488 A | 9/2000 |
| JP | 2002118841 A | 4/2002 |
| JP | 2004086532 A | 3/2004 |
| JP | 2005527126 A | 9/2005 |

OTHER PUBLICATIONS

International Search Report for PCT/JP2008/051077 mailed Mar. 11, 2008.
K. Takahashi, "Jisedai Tsushinmo NGN tte Nandaro?", Nikkei Network, Nov. 22, 2006, No. 80, pp. 067 to 083.
Hokky (café noir), "NGN de QoS Hosho Sareta VOD o Jitsugen Suru Tameni•••", CNET Japan, Jan. 22, 2007, http://japan.cnet.com/blog/cafe_noir/2007/01/22/ngnvod_0397/.

* cited by examiner

*Primary Examiner* — Hong Cho (57) ABSTRACT

The present invention aims to realize a system and method of reliably performing multicast communication via a bandwidth-guaranteed network, and provides a multicast communication system for performing multicast communication via a bandwidth-guaranteed network, the system including: a multicast proxy response device added with a group address destination identifier; and a multicast client, wherein the multicast proxy response device transmits a session connection request to the group address destination identifier of the multicast proxy response device when starting reception, the multicast proxy response device which has received said session connection request transmits a session connection response to said multicast client, and the multicast client receives multicast data through a bandwidth secured in the bandwidth-guaranteed network by the session connection response.

15 Claims, 6 Drawing Sheets

MULTICAST COMMUNICATION SYSTEM AND METHOD

This application is the National Phase of PCT/JP2008/051077, filed Jan. 25, 2008, which is based upon and claims priority from Japanese Patent Application No. 2007-016639 filed on Jan. 26, 2007, disclosure of which is incorporated herein in its entirety.

TECHNICAL FIELD

The present invention relates to a multicast communication system and method in a bandwidth-guaranteed network.

BACKGROUND ART

In bandwidth-guaranteed networks typified by NGNs (Next Generation Networks) a session control protocol is used to perform accounting, authentication, and reservation of communication bandwidth, etc. So far, the session control protocol has often been used to implement one-to-one communication such as telephone, and has rarely been utilized to control a session in one-to-many communication such as multicast. Because of this, it has been difficult to implement accounting, authentication, and reserving communication bandwidth in a multicast communication.

For example, although securement of the bandwidth of multicast communication by RSVP (Resource Reservation Protocol) has been under study and planning, it has not yet been widely used because of the difficulty of installing. Further, since multicast protocols typified by the IGMP (Internet group Management Protocol) cannot perform notification of communication bandwidth information, using multicast protocols to reserve communication bandwidth is difficult.

DISCLOSURE OF THE INVENTION

Problems to be Solved by the Invention

In order to guarantee a communication bandwidth in a bandwidth-guaranteed network, a call control by use of a session control protocol between a client and a server is necessary. Therefore, to guarantee a bandwidth in a one-to-many multicast communication, a call control by a multicast client and a multicast distribution server is necessary. Thus, a session control protocol needs to be implemented in a multicast client and a multicast distribution server which utilize a bandwidth-guaranteed network. However, since one-to-many communication is necessary when utilizing multicast, the following problems will arise which are different from those in the method of utilizing a session control protocol in unicast.

Problem 1

There is a case in which when a multicast distribution server distributes data, there is no client to receive that data. In such a case, a problem arises in that since there is no destination to which session control is performed, it is impossible to establish a session.

Problem 2

A multicast client arranged such that, after outputting a group join request, it does not receive data directly from the distribution server, but does receive a packet duplicated on the network. Therefore, the multicast client is not supposed to establish a session for a distribution server. Thus, a problem arises in that since there is no destination to which the multicast client performs session control, it is impossible to establish a session.

The present invention has been made in view of the above described problems, and its object is to realize a multicast communication system and a multicast communication method to enable reliably performing a multicast communication in a bandwidth-guaranteed network.

Means for Solving the Problems

The multicast communication system of the present invention is a multicast communication system for performing multicast communication via a bandwidth-guaranteed network, the multicast communication system characterized by comprising:

a multicast proxy response device added with a group address destination identifier; and a multicast client, wherein the multicast client transmits a session connection request to the group address destination identifier of the multicast proxy response device when starting reception, the multicast proxy response device, which has received the session connection request, transmits a session connection response to the multicast client, and the multicast client receives multicast data through a bandwidth secured by the session connection response in the bandwidth-guaranteed network.

In this case, the configuration may be such that when stopping the reception of multicast data, the multicast client transmits a session disconnection request to the group address destination identifier of the multicast proxy response device and, in response to the session disconnection request, the bandwidth secured in the bandwidth-guaranteed network is released.

The multicast communication system according to another aspect of the present invention is a multicast communication system for performing multicast communication via a bandwidth-guaranteed network, the multicast communication system characterized by comprising:

a multicast proxy response device added with a group address destination identifier; and a multicast distribution server, wherein the multicast distribution server transmits a session connection request to the group address destination identifier of the multicast proxy response device when starting distribution, the multicast proxy response device, which has received the session connection request, transmits a session connection response to the multicast distribution server, and the multicast distribution server distributes multicast data through a bandwidth secured by the session connection response in the bandwidth-guaranteed network.

The multicast communication method of the present invention is a multicast communication method for performing multicast communication via a bandwidth-guaranteed network including a multicast proxy response device to which a group address destination identifier has been added, the multicast communication method being characterized by comprising:

the multicast client transmitting a session connection request to the group address destination identifier of the multicast proxy response device when starting reception, the multicast proxy response device, which has received the session connection request, transmitting a session connection response to the multicast client, and the multicast client receiving multicast data through a bandwidth secured by the session connection response in the bandwidth-guaranteed network.

The multicast communication method according to another aspect of the present invention is a multicast communication method for performing multicast communication via a bandwidth-guaranteed network including a multicast proxy response device to which a group address destination identifier has been added, the multicast communication method being characterized by comprising:

the multicast distribution server transmitting a session connection request to the group address destination identifier of the multicast proxy response device when starting distribution, the multicast proxy response device, which has received the session connection request, transmitting a session connection response to the multicast distribution server, and the multicast distribution server distributing multicast data through a bandwidth secured by the session connection response in the bandwidth-guaranteed network.

The present invention attempts to solve the earlier cited problems by placing a multicast proxy response device on the network side.

The multicast proxy response device is supposed to have a group address destination identifier corresponding to a multicast group address, and their correspondence is managed by a multicast session management table. The multicast distribution server and the multicast client establish a session for the group address destination identifier.

As a result of that, a bandwidth for multicast communication is secured in a bandwidth-guaranteed network between the multicast distribution server and the network, and between the multicast client and the network. Further, by arranging cooperation with various servers which are responsible for audience rating measurement, audience-number acceptance management, and accounting management, when receiving such a session connection request or a session disconnection request, it also becomes possible to solve problems in an existing multicast distribution (inability to measure audience rating, inability to measure the number of audiences, inability to perform accounting, etc.) at the same time.

Since the present invention is configured as described above, effects as described below will be achieved.

A first effect to be mentioned is that the need for the session control protocol in the multicast distribution server to have a terminating function is obviated.

A second effect to be mentioned is that due to the first effect, it also becomes possible to decentralize the terminating function of the session control protocol, thereby reducing the load on the multicast distribution server.

A third effect to be mentioned is that it is possible to realize new functions, which have not been possible in existing multicast communications, such as authentication, accounting, audience rating measurement, encryption key management, license management, acquisition of audience personal information, advertisement distribution and program recommendation according to the preference of audiences, etc.

DESCRIPTION OF SYMBOLS

1 MULTICAST CLIENT
2 MULTICAST DISTRIBUTION SERVER
3 MULTICAST PROXY RESPONSE DEVICE
200 BANDWIDTH-GUARANTEED NETWORK
300 OTHER NETWORKS
310 SESSION CONTROL FUNCTION SECTION
311 GROUP ADDRESS DESTINATION IDENTIFIER MANAGEMENT DB
312 ADDRESS MANAGEMENT SECTION
313 APPLICATION MANAGEMENT SECTION
314 SESSION CONTROL PROTOCOL PROCESSING SECTION
315 SESSION CONTROL PROTOCOL COMMUNICATION SECTION
320 APPLICATION FUNCTION SECTION
321 AUTHENTICATION SECTION
322 LICENSE MANAGEMENT SECTION
323 ENCRYPTION KEY MANAGEMENT SECTION
324 USER PREFERENCE MANAGEMENT SECTION
325 ACCOUNTING SECTION
326 AUDIENCE RATING MEASUREMENT SECTION
327 PROGRAM RECOMMENDATION SECTION
328 ADVERTISEMENT DISTRIBUTION SECTION
329 PERSONAL INFORMATION ACQUISITION SECTION

BEST MODE FOR CARRYING OUT THE INVENTION

Next, exemplary embodiments will be described with reference to the drawings.

Figure 1:
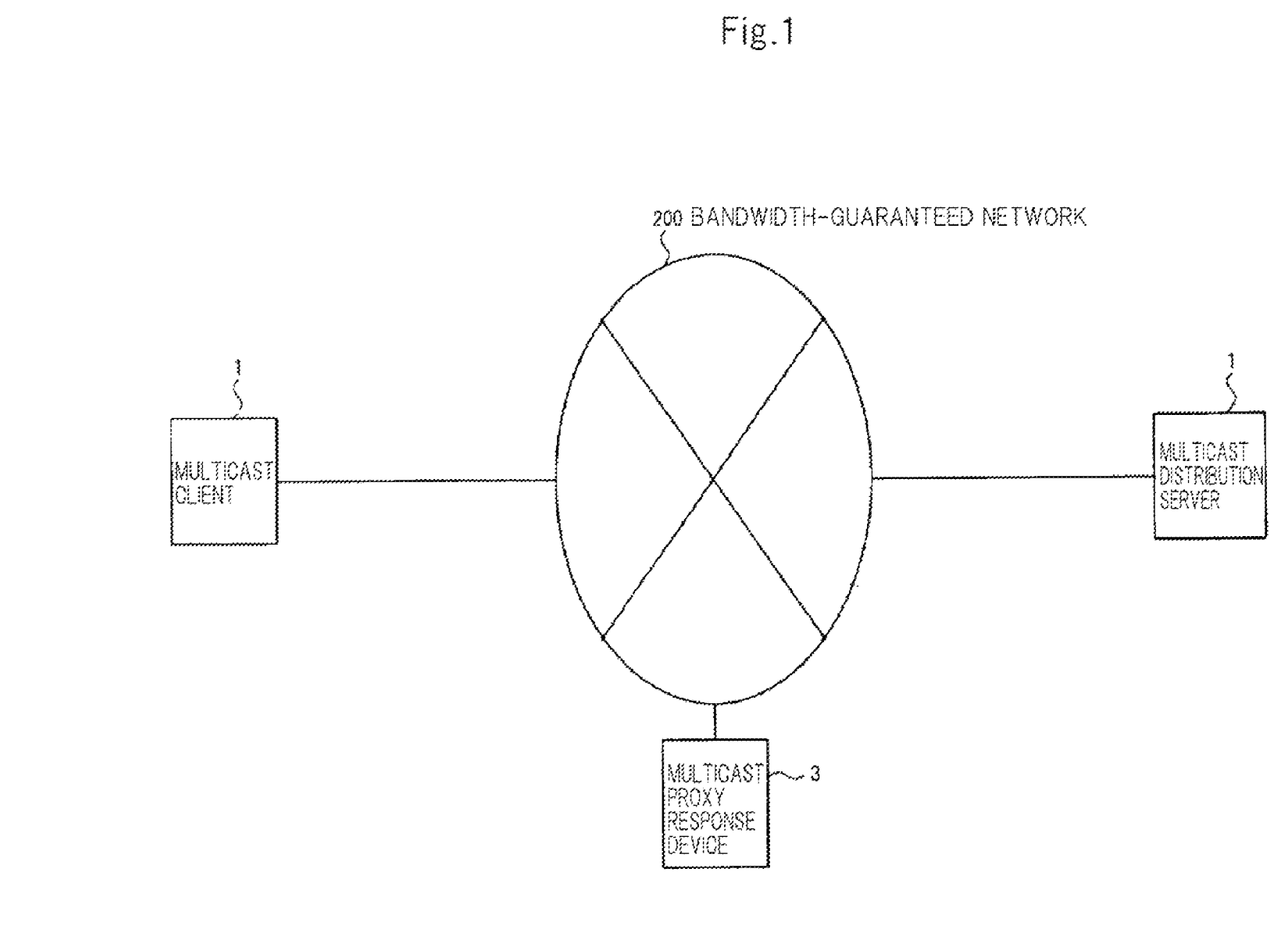
FIG. 1 is a block diagram to show the configuration of an exemplary embodiment of the system according to the present invention.

FIG. 1 is a block diagram to show the configuration of an exemplary embodiment of the system according to the present invention. As shown in FIG. 1, the present system is made up of multicast client 1, multicast distribution server 2, multicast proxy response device 3, and bandwidth-guaranteed network 200 which is an NGN network linking the existing.

Multicast client 1, which is a terminal at which it is desirable to receive multicast data, can guarantee a bandwidth for multicast in bandwidth-guaranteed network 200 by performing communication to multicast proxy response device 3 through the use of a session control protocol.

Multicast data can be received by performing a multicast reception request after completion of communication through the use of the session control protocol.

Further, another scheme may be envisioned in which a communication control device in bandwidth-guaranteed network 200 receives a multicast reception request transmitted from multicast client 1 and performs communication by use of the session control protocol in place of multicast client 1 and, after completion of the communication, the concerned communication control device transmits a multicast reception request.

Multicast distribution server 2, which is a terminal at which it is desirable to transmit multicast data, can guarantee a bandwidth for multicast communication in bandwidth guaranteed network 200 by performing communication by to multicast proxy response device 3 through the use of a session control protocol.

After completion of the communication by using the session control protocol, it is possible to perform transmission of multicast packets. Further, a scheme is envisioned in which a communication control device, which is located in bandwidth-guaranteed network 200, or which is adjacent to multicast distribution server 2 from the viewpoint of the network, receives multicast packets transmitted from multicast distribution server 2, and performs communication by use of the session control protocol in place of multicast distribution server 2.

Multicast proxy response device 3 is assigned a group address destination identifier and has a function of terminating a session control protocol addressed to a group address destination identifier from multicast client 1, multicast distribution server 2, and a communication control device in bandwidth-guaranteed network 200.

Bandwidth-guaranteed network 200 is a network whose bandwidth can be guaranteed by a session control protocol.

Figure 2:
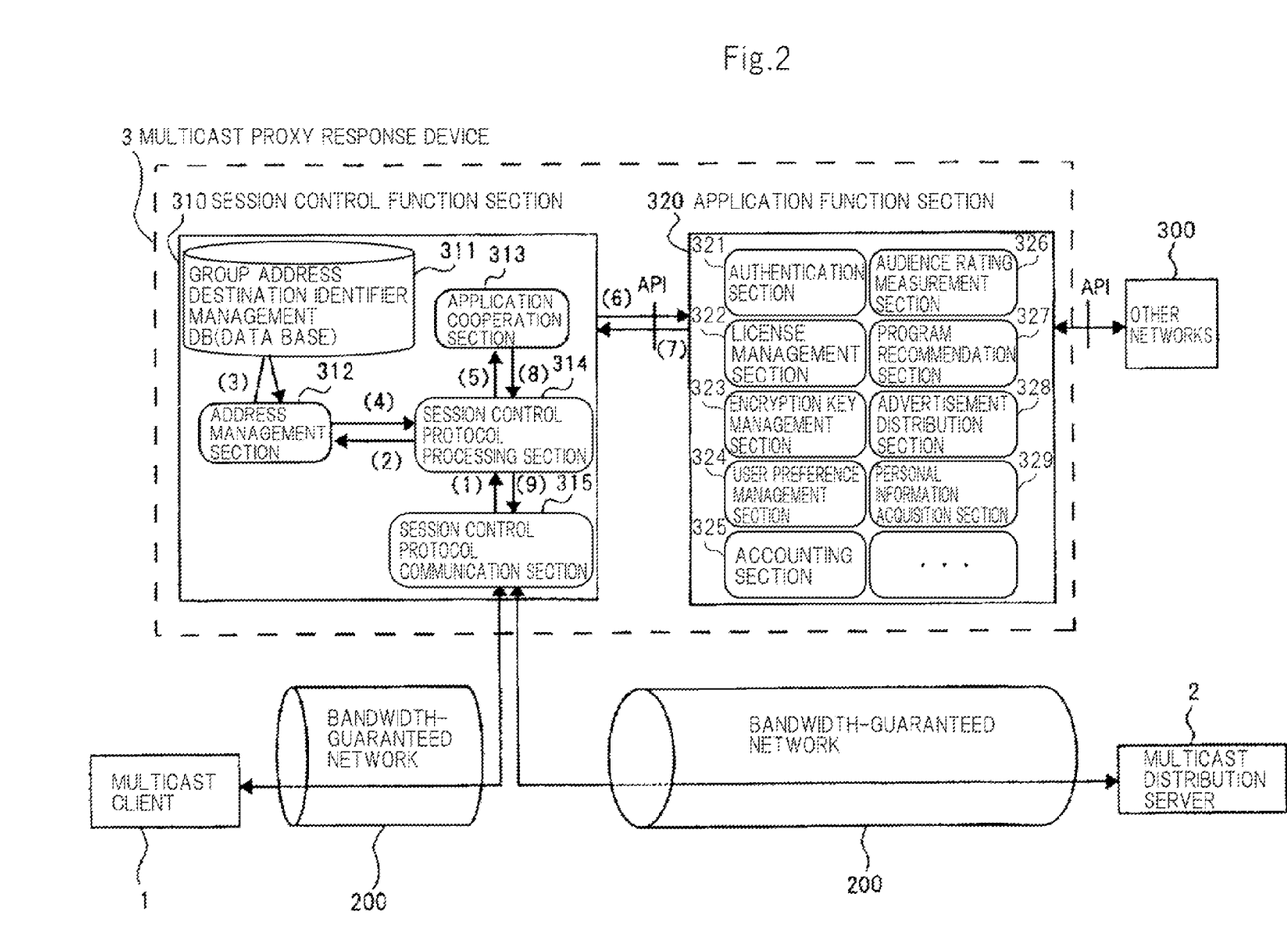
FIG. 2 is a block diagram to show in particular detail the configuration of multicast proxy response device 3 shown in FIG. 1.
Figure 3:
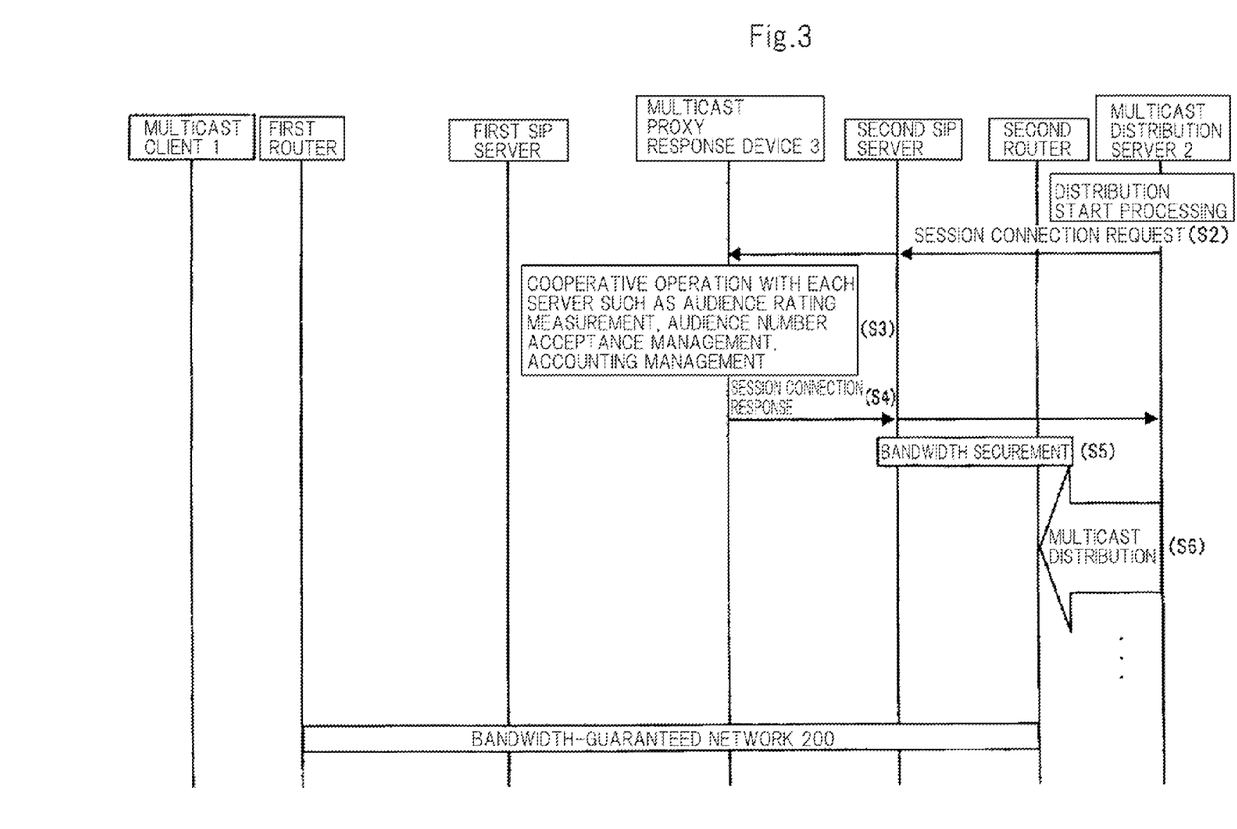
FIG. 3 is a sequence diagram to show the operation of the present exemplary embodiment.
Figure 4:
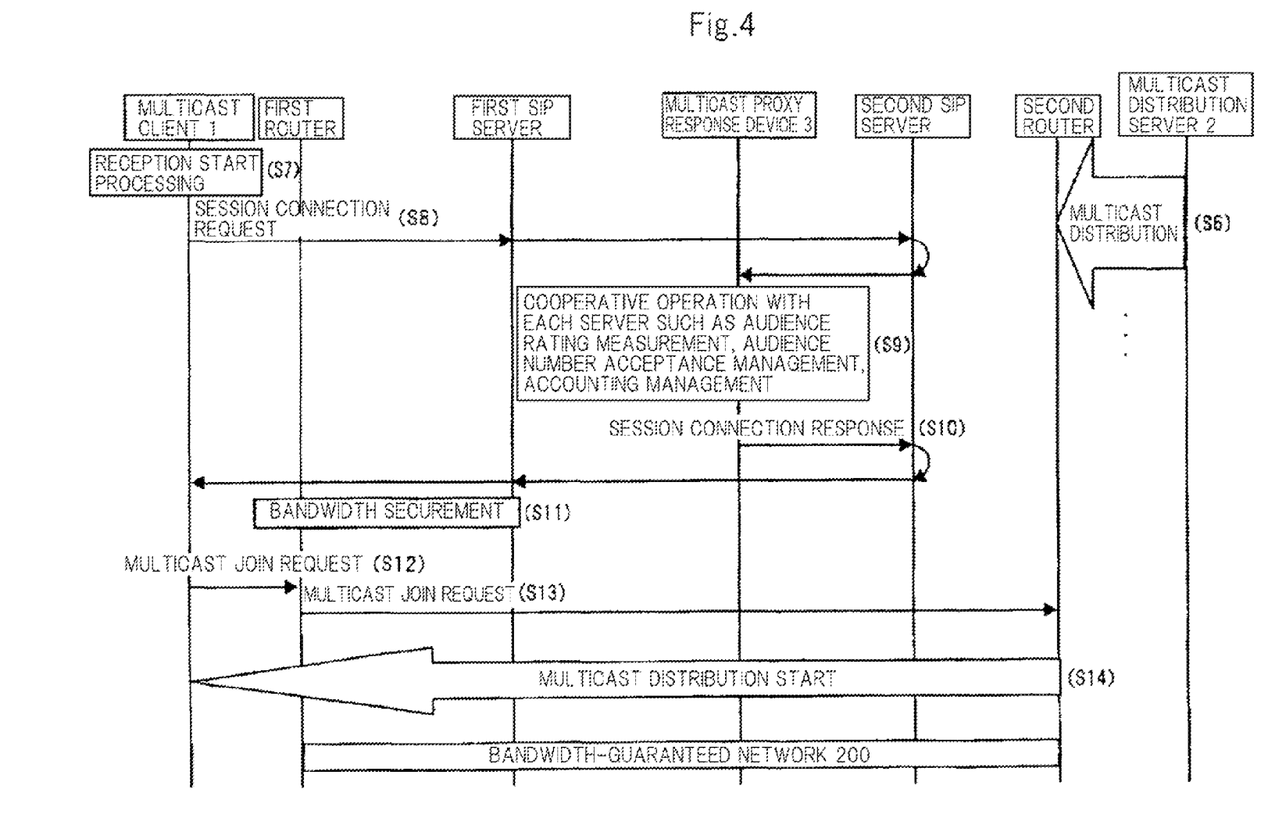
FIG. 4 is a sequence diagram to show the operation of the present exemplary embodiment.
Figure 5:
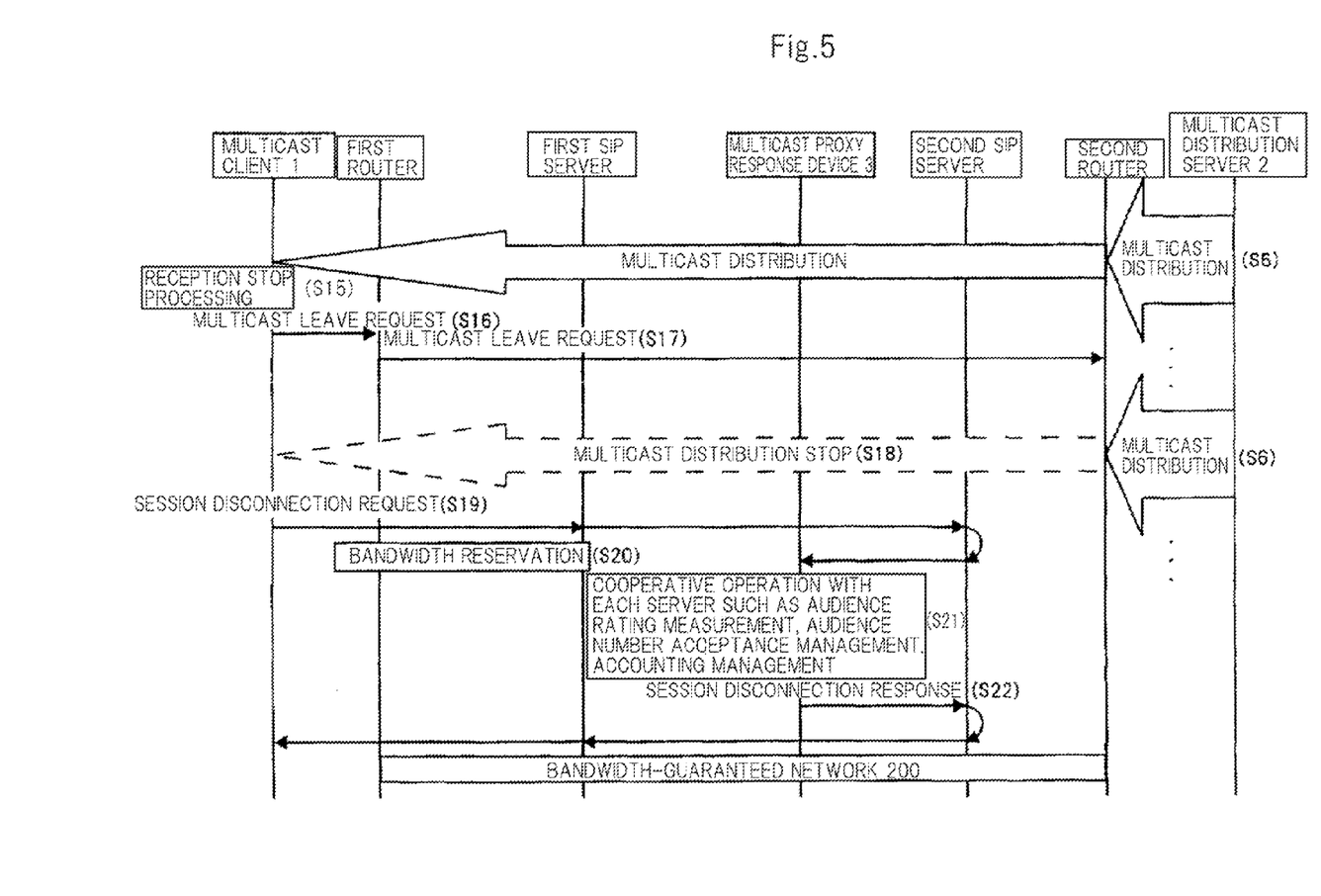
FIG. 5 is a sequence diagram to show the operation of the present exemplary embodiment.
Figure 6:
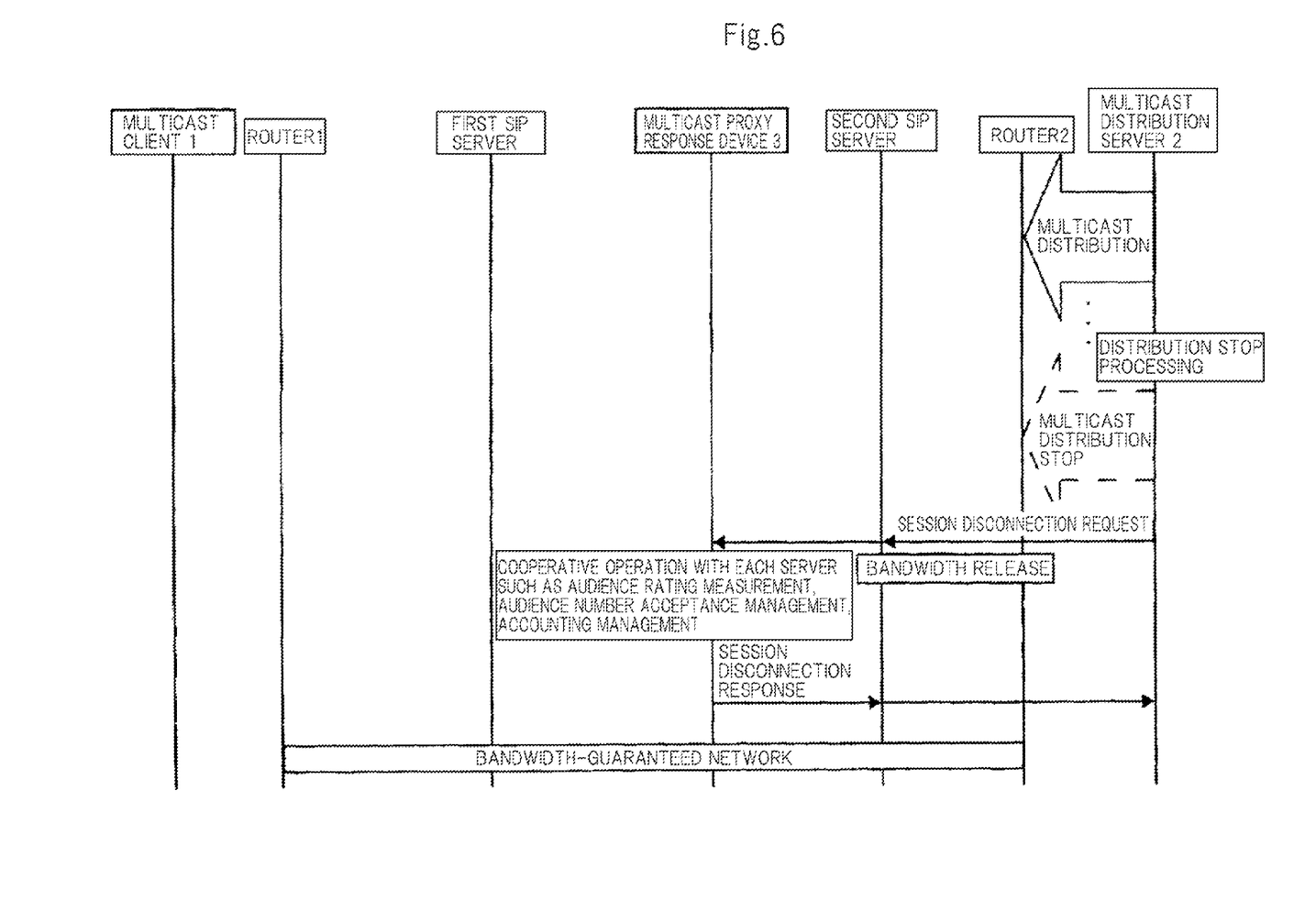
FIG. 6 is a sequence diagram to show the operation of the present exemplary embodiment.

FIG. 2 is a block diagram to show in particular detail the configuration of multicast proxy response device 3.

Multicast proxy response device 3 is made up of session control function section 310 and application function section 320.

Application function section 320 includes session control function section 310, and functions which are called up from other networks by use of an API, and specifically includes: authentication section 311 for performing authentication relating to multicast communications; license management section 312 for managing the licenses relating to multicast communications; encryption key management section 313 for managing encryption keys relating to multicast communications; user preference management section 314 for managing user preference information; accounting section 315 for managing user accounting information; audience rating measurement section 316 for measuring the audience rating of contents; program recommendation section 317 for managing recommended programs; advertisement distribution section 318 for distributing advertisements; personal information acquisition section 318 for acquiring user information; and others.

Session control function section 310 serves to perform the termination of session control protocols and the management of group address destination identifiers, and includes: group address destination identifier management DB (data base) 311; address management section 312; application cooperation section 313; session management protocol processing section 314; and session management protocol communication section 315. Each section operates as follows.

Session control protocol communication section 315 terminates communication by using the session control protocol received from bandwidth-guaranteed network 200, and notifies the communication content to session control protocol processing section 314 (1).

Session control protocol processing section 314 notifies the group address destination identifier included in the communication content to address management section 312 (2).

Address management section 312 obtains the group's multicast address from group address destination identifier management DB 311 based on the group address destination identifier (3).

Address management section 312 notifies the group's multicast address obtained from group address destination identifier management DB 311 to session control protocol processing section 314 (4).

Session control protocol processing section 314 notifies necessary information to application cooperation section 313 depending on the setting of multicast proxy response device 3, group address destination identifier, and the type of multicast client, and requests processing (5).

In order to perform the processing requested in (5), the application cooperation section makes a request for processing to an appropriate function block included in application function section 320, using an API (Application Program Interface) (6).

The appropriate function block included in application function section 320 notifies a response to the request for processing to application cooperation section 313 by using the API (7).

Application cooperation section 313 notifies the response to the request for processing to session control protocol processing section 314 (8).

Session control protocol processing section 314 creates a session control protocol response based on the information obtained in (4) and (8), and notifies the content thereof to session control protocol communication section 315 (9).

Session control protocol communication section 315 performs session control for a communication network with multicast client 1 and multicast distribution server 2 by using the session control protocol. As the result of performing this communication, a bandwidth required for multicast communication within a bandwidth-guaranteed network is guaranteed.

The order of the above described processing (2) to (4) and (5) to (8) may be reversed in order such that (5) to (8) is followed by (2) to (4).

Application function section 320 includes an acceptance interface by an API with other networks (including bandwidth-guaranteed networks) 300 other than session control function section 310, and can perform the processing requested via other networks 300. This makes it possible to receive services included in an application function section across a network. The protocol to implement such a service may be HTTP or HTTPS.

Next, each component of application function section 320 will be described in detail.

Authentication section 321 authenticates whether or not a service is allowed to be provided to the concerned terminal, based on a single or multiple keys of an IP address of the terminal, a destination identifier, a UserID/Password and a computer name used in the session control protocol.

License management section 322 supervises whether or not the concerned terminal or the concerned user has bought the license.

Encryption key management section 323 manages encryption keys for all content or all users, or a combination of those, and provides an encryption key in response to an encryption key request from a user or terminal.

User preference management section 324 manages user preferences which are the results based upon an analyses of the viewing history of each user and the behavior of each user that leads to the selection of content.

Accounting section 325 operates when a pay service is performed for a user such as at the time of license purchase and content viewing, and provides a function for a retroactive accounting history display function to a user.

Audience rating measurement section 326 has a function to measure the audience rating of certain content and discloses the audience rating to third parties.

Program recommendation section 327 recommends content which is considered to be able to convey information which meets the user's preference based on the user preference.

Advertisement distribution section 328 performs advertisement distribution in accordance with the sponsor of the content, advertisement distribution being based on the preference of users, and advertisement distribution being based on the content itself, and also can utilize them in combination.

Personal information acquisition 329 has a function of acquiring personal information of users and realizes information about the time which content is viewed by users and the content purchase history of users, information concerning the kind of advertisements that are of interest to users, the likelihood that a user will view a recommended program, and information about whether or not user interest in contend depends upon whether the content is free or will charged.

These individual sections defined by application function section 320 may operate in such a way that functions thereof cooperate with each other.

It is noted that the session control function section and the application function section of the multicast proxy response device may be physically separate devices, and the API may utilize a distributed object technology such as SOAP (Simple Object Access Protocol) and CORBA (Common Object Request Broker Architecture).

FIGS. 3 to 6 are sequence diagrams to show the operation of the present exemplary embodiment. Hereinafter, the operation of the present exemplary embodiment will be described with reference to FIGS. 3 to 6.

First, outline of the connection processing will be described.

By distribution start processing (S1), multicast distribution server 2 transmits a session connection request (S2) to the SIP-URI owned by multicast proxy response device 3. Bandwidth-guaranteed network 200 includes as its components, an SIP server, a proxy server, a Router and RACS, by which necessary bandwidth for application communications will be reserved according to the content of session connection request S2. At this moment, there may be an SIP server and a proxy server between multicast distribution server 2 and multicast proxy response device 3.

Multicast proxy response device 3, which has received session connection request S2, performs cooperative operations with each section of application function section 320 (S3) in accordance with the content of the session connection request S2, and transmits a session connection response (S4) to multicast distribution server 2. In bandwidth-guaranteed network 200, which has received the session connection response, a bandwidth required for application communication is secured (S5) according to the content of session connection response S4.

Multicast distribution server 2 starts distribution of multicast data (S6) to bandwidth-guaranteed network 200. In this situation, there is no multicast client which is joining the multicast group. Therefore, packets will not be transferred to a router, which is located on the network side, from the second Router, which is a first hop router on the side of multicast distribution server 2 of bandwidth-guaranteed network 200.

By reception start processing (S7), multicast client 1 transmits a session connection request (S8) to the SIP-URI owned by multicast proxy response device 3. In bandwidth-guaranteed network 200, bandwidth necessary for application communication will be reserved in accordance with the content of the session connection request. At this moment, there may be an SIP server and a proxy server between multicast client 2 and multicast proxy response device 3.

Multicast proxy response device 3, which has received session connection request S8, performs cooperative operations with each section of application function section 320 (S9) in accordance with the content of session connection request S8, and transmits a session connection response (S10) to multicast client 1. In bandwidth-guaranteed network 200, a bandwidth necessary for application communication is secured in accordance with the content of session connection response S10.

Multicast client 1 transmits a multicast join request (S12) to bandwidth-guaranteed network 200, and the multicast join request is transferred (S13) from the first Router, which is a first hop router on the side of multicast client 1 of bandwidth-guaranteed network 200, to the second Router, which is a first hop router on the side of multicast distribution server 2 of bandwidth-guaranteed network 200 so that distribution of multicast data is started (S14).

Next, an outline of disconnection processing will be described.

By reception stop processing (S15), multicast client 1 transmits a multicast leave request (S16) to bandwidth-guaranteed network 200 and, as the result of the multicast leave request being transferred (S17) from the first Router to the second Router, distribution of the multicast data from bandwidth-guaranteed network 200 stops (S18).

Multicast client 1 transmits a session disconnection request (S19) to the SIP-URI owned by multicast proxy response device 3. In bandwidth-guaranteed network 200, the bandwidth which has been secured for application communication is released (S20) in accordance with the content of session disconnection request S19. At this moment, there may be a SIP server and a proxy server between multicast client 1 and multicast proxy response device 3.

Multicast proxy response device 3, which has received the session disconnection request, operates in cooperation with each section of application function section 320 (S21) and transmits a session disconnection response to multicast client 1 (S22).

By distribution stop processing (S23), multicast distribution server 2 stops distribution of multicast data to bandwidth-guaranteed network 200 (S24).

Multicast distribution server 2 transmits a session disconnection request to the SIP-URI owned by multicast proxy response device 3 (S25). In bandwidth-guaranteed network 200, the bandwidth which has been secured for application communication is released (S26) in accordance with the content of session disconnection request S25. At this moment, there may be a SIP server and a proxy server between multicast distribution server 2 and multicast proxy response device 3.

Multicast proxy response device 3, which has received the session disconnection request, operates in cooperation with each section of application function section 320 (S27), and transmits a session disconnection response to multicast distribution server 2 (S28).

It is noted that although the cooperation performed at S3, S9, S21, and S27 between multicast proxy response device 3 and each section of application function section 320 mainly includes audience rating measurement by audience rating measurement section 326, audience-number acceptance management by license management section 322, accounting management by accounting section 325, and the like, in addition to those, processings by each section of application function section 320, as described above, will be included.

It is noted that a multicast client can also utilize the session control protocol to acquire a group's multicast address and an IP address of a multicast distribution server from a multicast proxy response device.

Further, configuration may be such that when a communication device in bandwidth-guaranteed network 200 receives a multicast reception request transmitted from multicast client 1, the communication device transmits the session connection request to multicast proxy response device 3.

Although the present invention has been described with reference to exemplary embodiments so far, the present invention will not be limited to the above described exemplary embodiments. The configuration and details of the present invention are subject to various modifications which are understandable to those skilled in the art within the scope of the present invention.

The invention claimed is:

1. A multicast communication system for performing multicast communication via a bandwidth-guaranteed network, said multicast communication system characterized by comprising:
a multicast proxy response device to which a group address destination identifier has been added; and
a multicast client, wherein
said multicast client transmits a session connection request to the group address destination identifier of said multicast proxy response device when starting reception,
said multicast proxy response device, which has received said session connection request, transmits a session connection response to said multicast client, and
said multicast client receives multicast data through a bandwidth secured by the session connection response in said bandwidth-guaranteed network.

2. The multicast communication system according to claim 1, characterized in that
when stopping reception of multicast data, the multicast client transmits a session disconnection request to the group address destination identifier of the multicast proxy response device and, in response to said session disconnection request, the bandwidth secured in the bandwidth-guaranteed network is released.

3. The multicast communication system according to claim 2, characterized in that
the multicast proxy response device comprises a session control function section for performing management of the termination of session control protocols and group address destination identifiers, and an application function section for performing authentication, accounting, audience rating measurement, encryption key management, license management, acquisition of audience personal information, advertisement distribution and program recommendation according to the preference of audiences, etc.; and upon receipt of the session disconnection request, accepts the result of the cooperative operation with said application function section to transmit a session disconnection response to said multicast client.

4. The multicast communication system according to claim 1, characterized in that
the multicast proxy response device comprises a session control function section for performing the termination of a session control protocol and the management of group address destination identifiers, and an application function section for performing authentication, accounting, audience rating measurement, encryption key management, license management, acquisition of audience personal information, advertisement distribution and program recommendation according to the preference of audiences, etc.; and upon receipt of the session connection request, accepts the result of cooperative operation with said application function section to transmit a session connection response to said multicast client.

5. The multicast communication system according to claim 4, characterized in that
the session control function section and the application function section of the multicast proxy response device perform processing by using a distributed object technology.

6. The multicast communication system according to claim 4, characterized in that
the application function section comprises an acceptance interface from other networks, and performs acceptance of a service which is implementable by said application function section across a network using an HTTP or HTTPS protocol.

7. The multicast communication system according to claim 1, characterized in that
the session control function section and the application function section of the multicast proxy response device perform processing by using an API.

8. The multicast communication system according to claim 1, characterized in that
the multicast client makes use of a session control protocol to acquire a group's multicast address and an IP address of the multicast distribution server from the multicast proxy response device.

9. The multicast communication system according to claim 1, characterized in that
a communication device in the bandwidth-guaranteed network, upon receipt of a multicast reception request transmitted from a multicast client, transmits said session connection request to the multicast proxy response device.

10. A multicast communication system for performing multicast communication via a bandwidth-guaranteed network, said multicast communication system characterized by comprising:
a multicast proxy response device to which a group address destination identifier has been added; and
a multicast distribution server, wherein
said multicast distribution server transmits a session connection request to the group address destination identifier of said multicast proxy response device when starting distribution,
said multicast proxy response device, which has received said session connection request, transmits a session connection response to said multicast distribution server, and
said multicast distribution server distributes multicast data through a bandwidth secured by the session connection response in said bandwidth-guaranteed network.

11. The multicast communication system according to claim 10, characterized in that
the multicast distribution server transmits a session disconnection request to the group address destination identifier of the multicast proxy response device when stopping the distribution of multicast data, and the bandwidth secured in the bandwidth-guaranteed network is released in response to said session disconnection request.

12. The multicast communication system according to claim 11, characterized in that
the multicast proxy response device comprises a session control function section for performing management of the termination of session control protocols and group address destination identifiers, and an application function section for performing authentication, accounting, audience rating measurement, encryption key management, license management, acquisition of audience personal information, advertisement distribution and program recommendation according to the preference of audiences, etc.; and upon receipt of the session disconnection request, accepts the result of the cooperative operation with said application function section to transmit a session disconnection response to said multicast distribution server.

13. The multicast communication system according to claim 10, characterized in that
the multicast proxy response device comprises a session control function section for performing management of the end points of session control protocols and group address destination identifiers, and an application function section for performing authentication, accounting, audience rating measurement, encryption key management, license management, acquisition of audience personal information, advertisement distribution and program recommendation according to the preference of audiences, etc.; and upon receipt of the session connection request, accepts the result of the cooperative operation with said application function section to transmit a session connection response to said multicast distribution server.

14. A multicast communication method for performing multicast communication via a bandwidth-guaranteed network including a multicast proxy response device to which a group address destination identifier has been added, said multicast communication method being characterized by comprising:
said multicast client transmitting a session connection request to the group address destination identifier of said multicast proxy response device when starting reception,
said multicast proxy response device, which has received said session connection request, transmitting a session connection response to said multicast client, and
said multicast client receiving multicast data through a bandwidth secured by the session connection response in said bandwidth-guaranteed network.

15. A multicast communication method for performing multicast communication via a bandwidth-guaranteed network including a multicast proxy response device to which a group address destination identifier has been added, said multicast communication method characterized by comprising:
said multicast distribution server transmitting a session connection request to the group address destination identifier of said multicast proxy response device when starting distribution,
said multicast proxy response device, which has received said session connection request, transmitting a session connection response to said multicast distribution server, and
said multicast distribution server distributing multicast data through a bandwidth secured by the session connection response in said bandwidth-guaranteed network.

* * * * *